Figure 1:
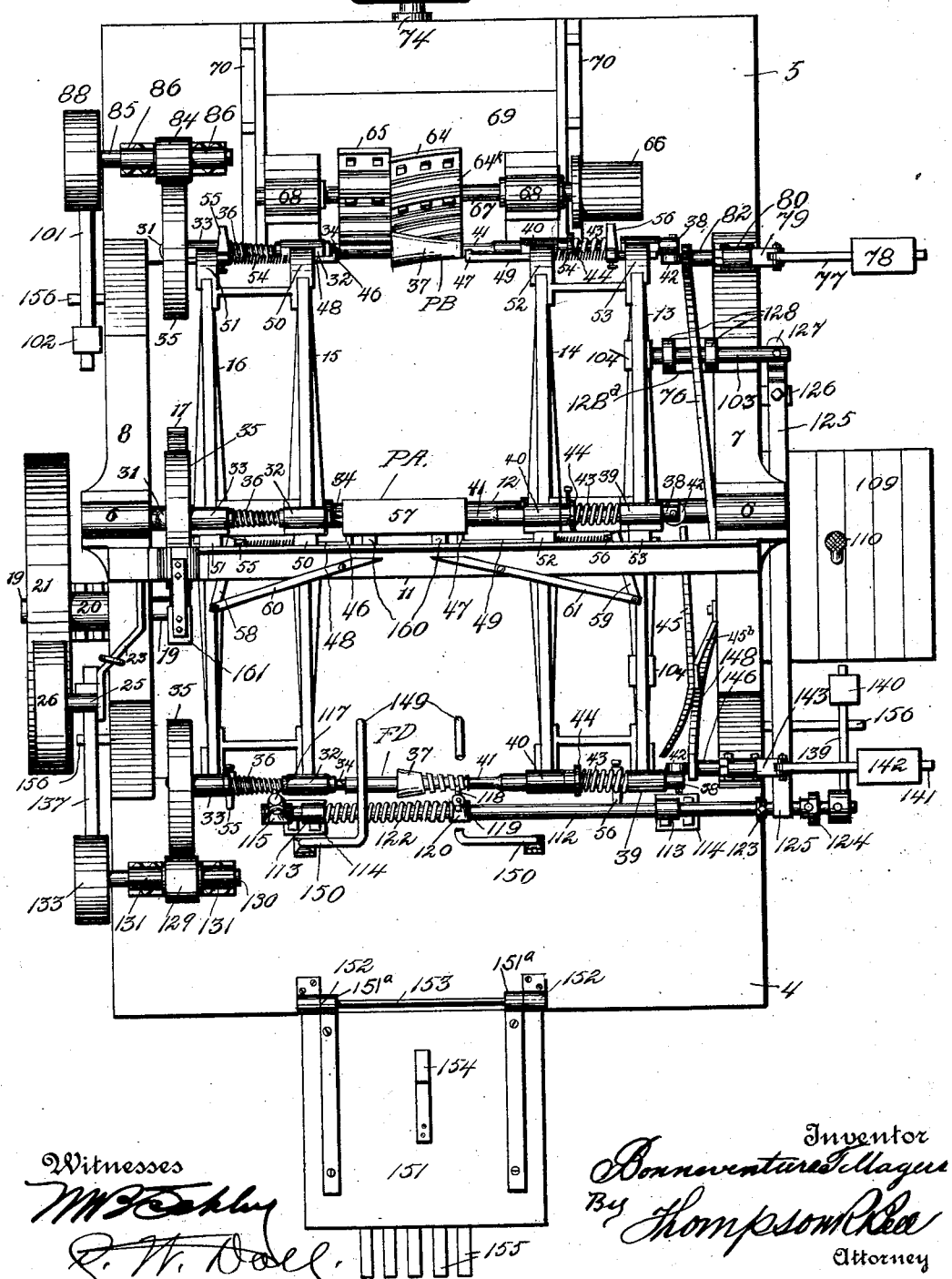

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 1.

Witnesses
Inventor
Bonnaventure T. Magers
By Thompson Rea
Attorney

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 2.
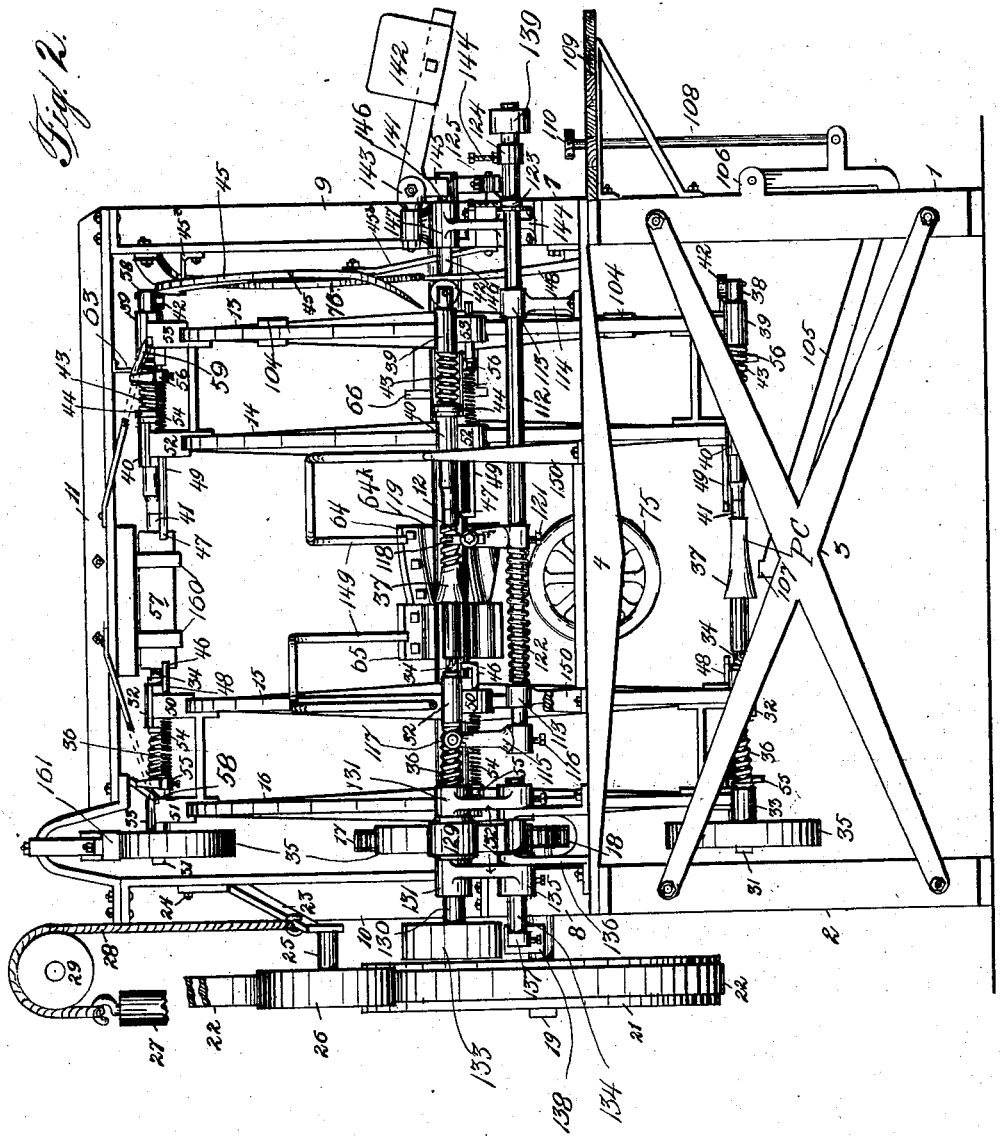
Witnesses
Chas. M. Havell
P. W. Doll
Inventor
Bonaventure Magers
By Thompson & Bell
Attorney No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 3.
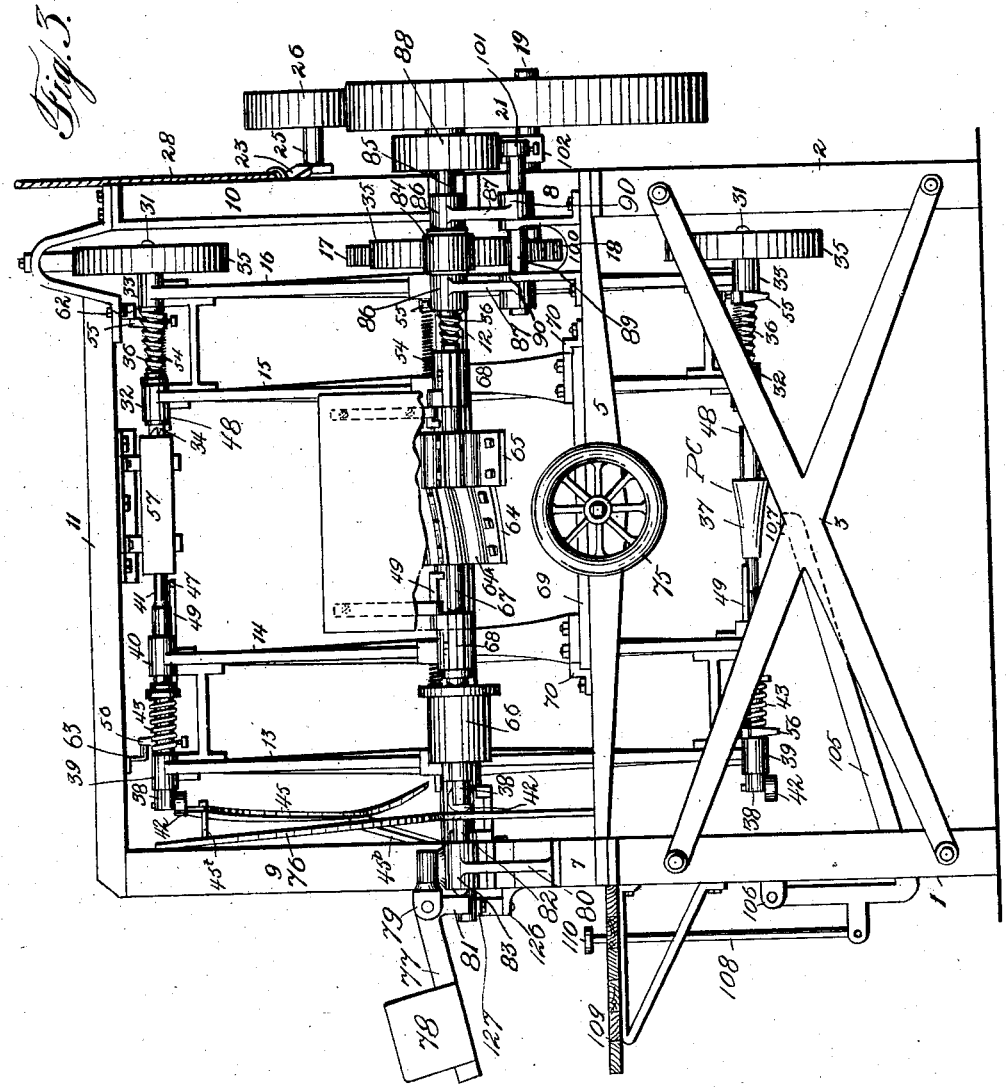

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 4.
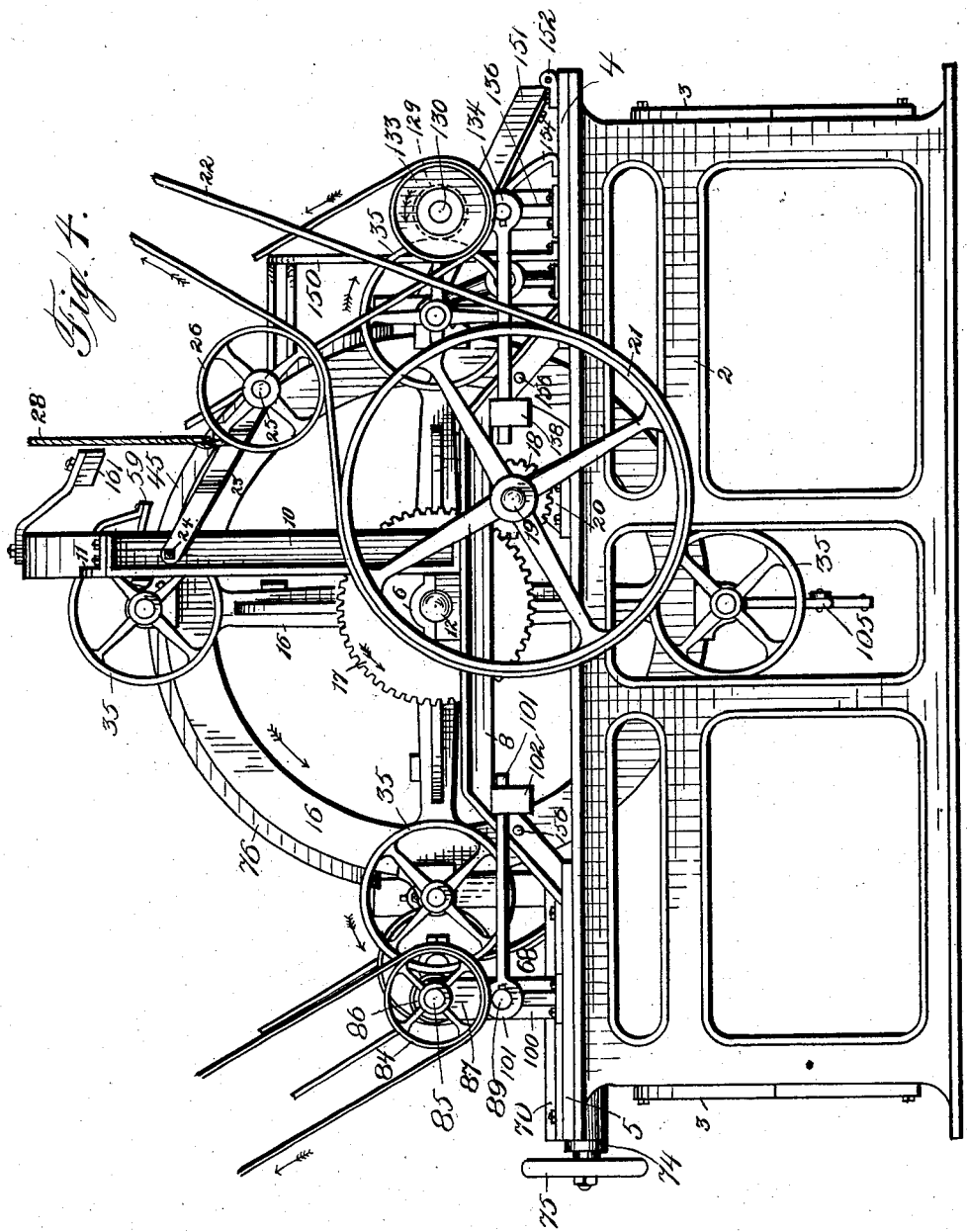

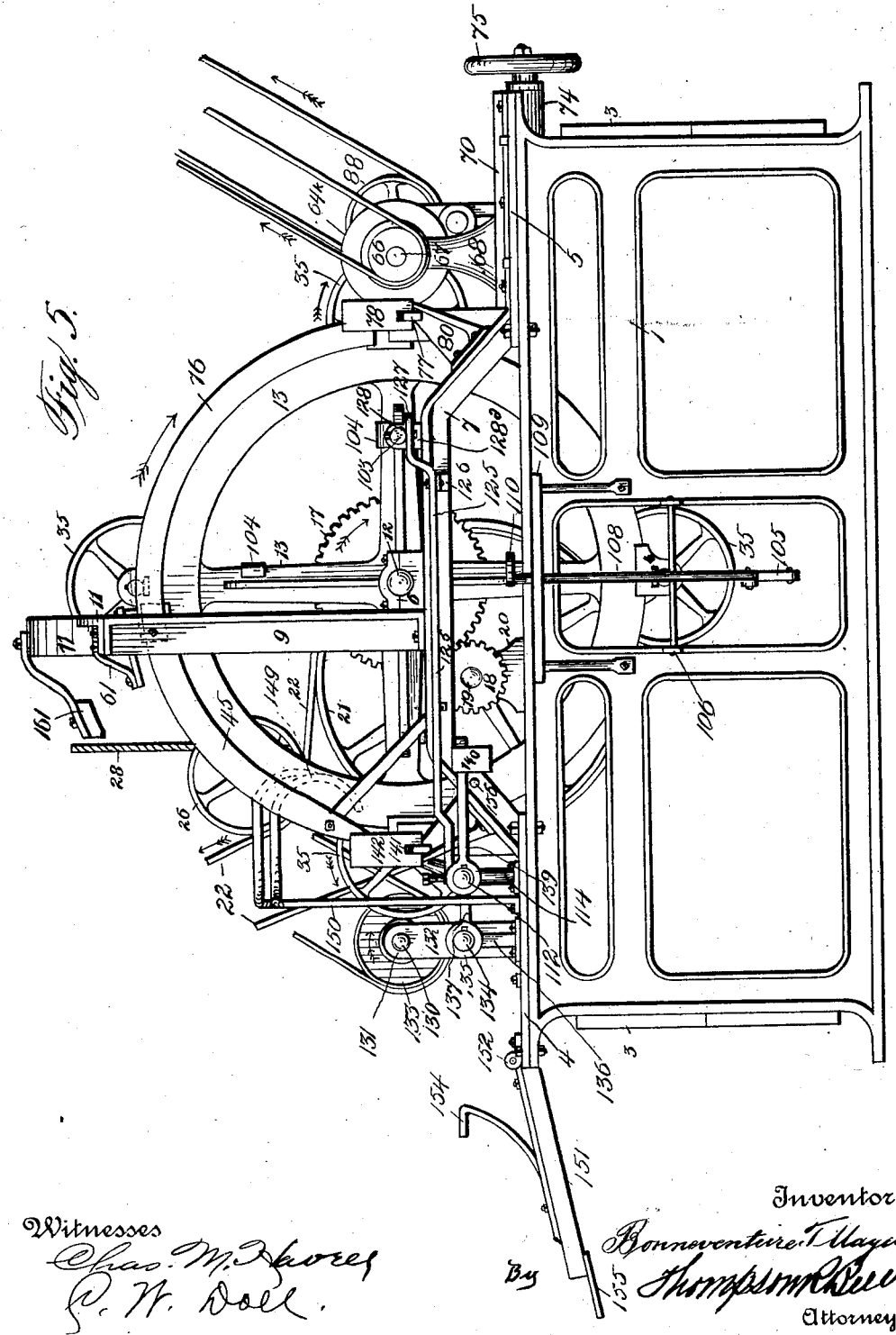

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 6.
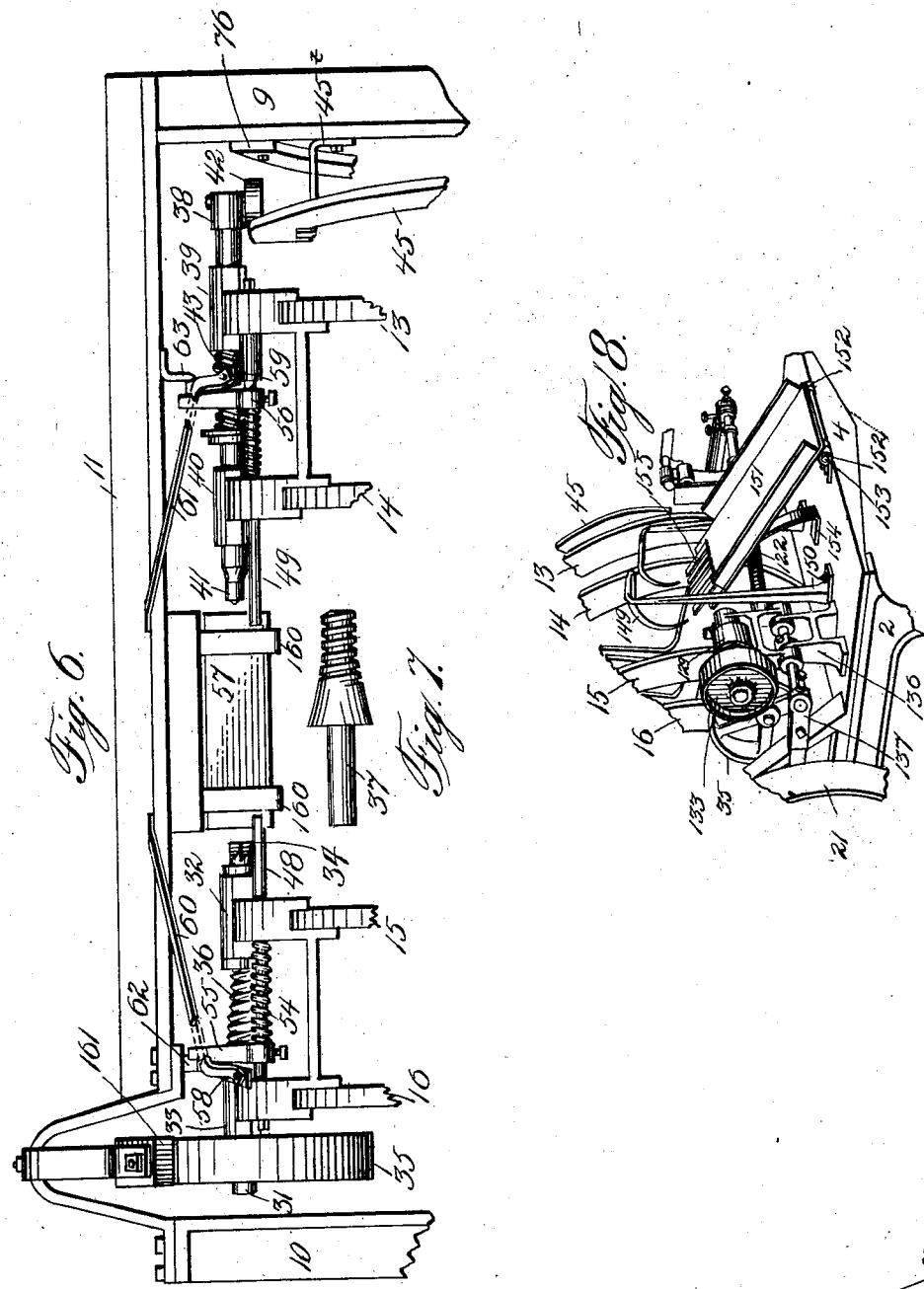

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 7.
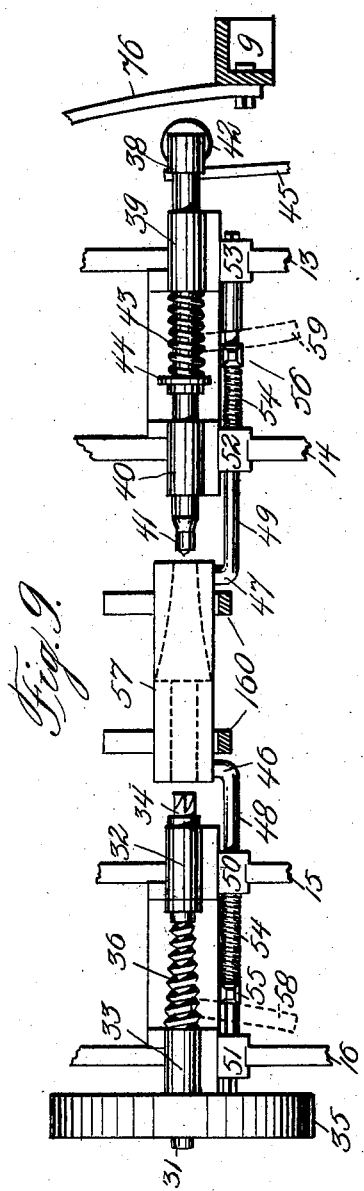
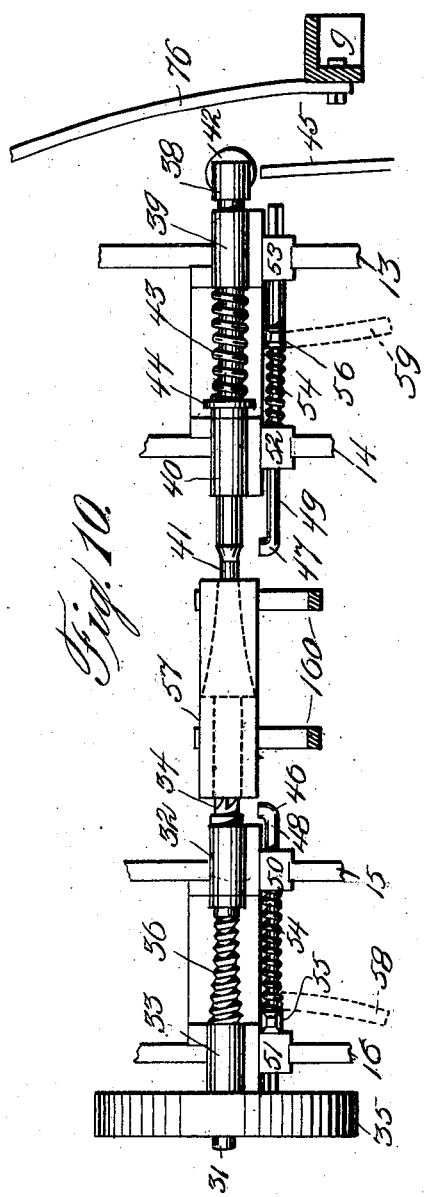

No. 750,209. PATENTED JAN. 19, 1904.
B. T. MAGERS.
AUTOMATIC TURNING MACHINE.
APPLICATION FILED FEB. 13, 1903.
NO MODEL. 8 SHEETS—SHEET 8.
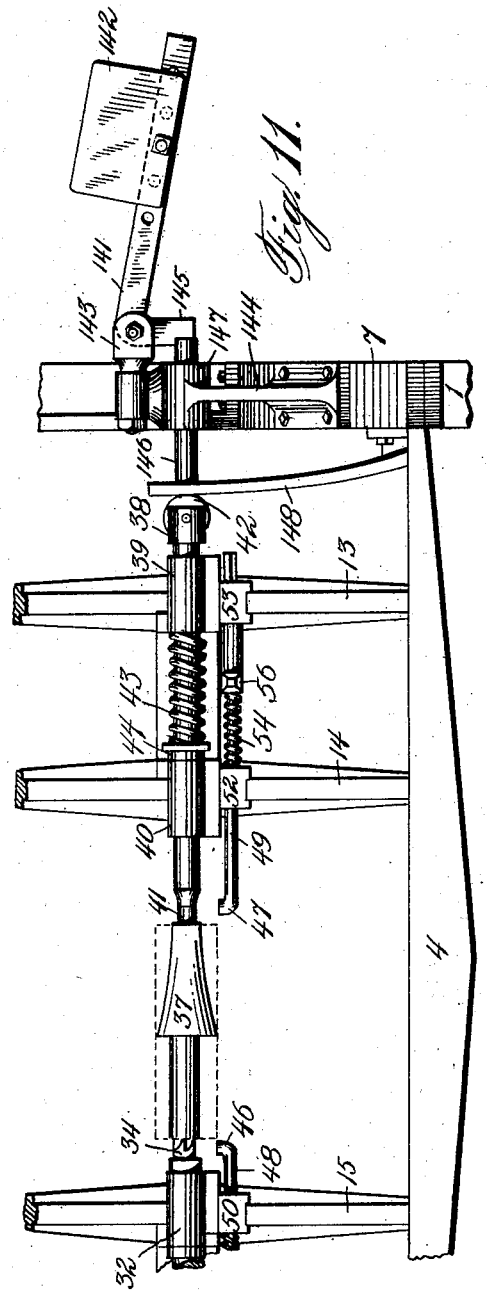
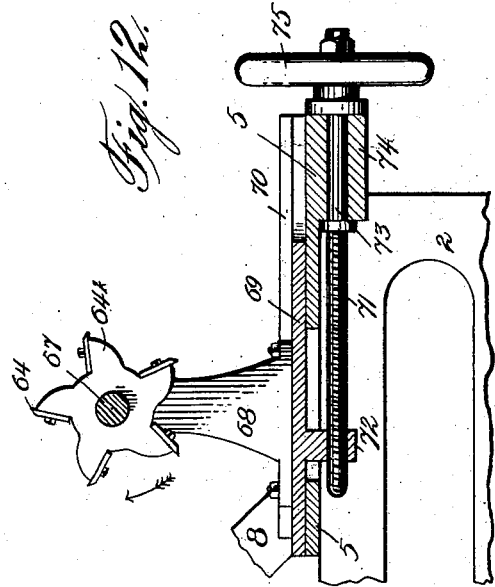

No. 750,209. Patented January 19, 1904.

UNITED STATES PATENT OFFICE.

BONNEVENTURE T. MAGERS, OF MADISON, INDIANA, ASSIGNOR TO THE INDIANAPOLIS ARM, BRACKET AND PIN COMPANY, OF MADISON, INDIANA.

AUTOMATIC TURNING-MACHINE.

SPECIFICATION forming part of Letters Patent No. 750,209, dated January 19, 1904.

Application filed February 13, 1903. Serial No. 143,269. (No model.)

*To all whom it may concern:*

Be it known that I, BONNEVENTURE T. MAGERS, a citizen of the United States, residing at Madison, in the county of Jefferson and State of Indiana, have invented new and useful Improvements in Automatic Turning-Machines, of which the following is a specification.

My invention relates to certain new and useful improvements in automatic wood-turning lathes for turning telegraph, telephone, or other insulator pins and handles or other rounded articles, of which the following is a full, clear, and exact description.

The object of this invention is to provide means whereby handles, pins, or other rounded articles may be made rapidly and at small cost, also to construct such means to operate automatically to turn insulator pins, handles, and other rounded articles rapidly and cheaply. I attain these objects by means of the machine illustrated in the accompanying drawings, in which similar numerals of reference designate like parts throughout the several views.

Figure 1 is a plan view of the machine. Fig. 2 is a front end elevational view of same, showing the receiving-hopper of the machine removed. Fig. 3 is a rear end elevational view showing the revolving knife-head. Fig. 4 is a side elevational view of the machine, showing the drive side of the machine. Fig. 5 is a side elevational view of the machine, showing the operator's side of the machine. Fig. 6 is an enlarged detail broken view showing the upper portion of the machine. Fig. 7 is an enlarged detail view of a finished pin. Fig. 8 is a broken off perspective view of the front or delivering end of the machine and showing the chute in its proper position when the machine is in operation. Fig. 9 is an enlarged detail view of the chucking-heads, showing the centers thereof in position ready to engage the blank or block to be turned. Fig. 10 is a similar view showing the blank engaged by the centers of the chuck and ready to convey the blank or block to that part of the machine to be turned or dressed into the proper form. Fig. 11 is an enlarged detail view showing the cam-roller of the dead-center chuck in contact with the chucking-cam and the reinforcing means, whereby a yielding force is applied to said chucking-cam; and Fig. 12 is an enlarged detail sectional view of the revolving knife-head.

The side frames 1 and 2, the end frames 3, secured to the front and rear ends of said side frames, and the front and rear platens 4 and 5, secured to the forward and rear top side portions of said frames, constitute the main supporting-frame of the machine. The bearings 6 are secured to the pedestals or bases 7 and 8 or are formed integral thereon, and the latter are secured on the top sides of the frames 1 and 2. The uprights 9 and 10 are secured on the top sides of the pedestals or bases 7 and 8, and a cross-beam 11 rests on the top ends of said uprights and is firmly bolted or otherwise secured thereto.

A carrier-shaft 12, on which is secured the carrier to turn therewith, which latter is constituted of the spiders 13, 14, 15, and 16, is rotatably supported in the bearings 6, and on the end of said shaft 12 is keyed or otherwise secured the gear-wheel 17, which meshes with its driving-gear 18, secured on the shaft 19. The shaft 19 turns in its bearings 20, secured on the side frame 2, and on the outer projecting end of said shaft 19 is secured the belt-pulley 21, which is driven by a suitable driving-belt 22, extending from an overhead shaft.

An arm 23 is pivotally secured to the side of the upright 10 by a bolt 24, and on the free end of said arm is secured the stud 25, on which the belt-tightening pulley 26 is mounted to turn thereon.

The tension of the belt 22 is adjusted by means of the counterweight 27, (see Fig. 2,) secured to the end of the rope 28, which latter passes over a fixed overhead pulley 29, and said rope is secured at its opposite end to the pivotal pulley-carrying arm 23 at or near the free end thereof, according as the belt-tightening pulley is required to press against the drive-belt 22.

A series of four or more chucking-centers are secured to the peripheries of the spiders 13, 14, 15, and 16 at equally-divided distances round the periphery of the carrier constituted of said spiders, and said chucking centers or heads have their axes extending longitudinally and parallel with the axis of the carrier-shaft 12, and each of said chucking-heads are preferably alike in form and construction, and the said chucking-heads are composed of a live or chucking head and a dead or centering head similar in many respects to the live and dead heads of a wood-turning lathe, one pair of which heads, constituting a perfect and complete chucking-head, I will now proceed to describe.

The live or revoluble spindle 31 is mounted in fixed bearings 32 and 33, secured on the periphery of the carriers 13 and 14 parallel with the axis of the latter, and the said spindle 31 is provided with the chucking-tool or live center-tool 34, which is removably secured to the inner or chucking end of said spindle 31, and on the opposite end of said spindle is secured the friction drive-pulley 35, which latter turns with said spindle. Situated intermediate the bearings 32 and 33 is the master-screw 36, which is threaded to correspond with the threads to be formed or cut in the end of the pin 37, and the said master-screw is tapered to correspond with the tapered surface or profile of said pin 37. The tail-stock or dead head-spindle 38 is mounted in the fixed bearings 39 and 40 to be moved longitudinally therein, and said bearings are secured on the carriers or the spiders 15 and 16, constituting the right-hand portion of the carrier, in such position thereon to be in perfect alinement and directly opposed to the axis of the live head-spindle 31, and said spindle 38 is provided with the centering-tool 41 at one end and the cam-roller 42, which is pivotally mounted on the opposite end of said spindle. A coil-spring 43 surrounds said spindle 38 and is situated intermediate the bearings 39 and the collar 44, which latter is secured on said spindle 38, and the said coil-spring 43 is provided for the purpose of moving said spindle 38 longitudinally when the latter is released from its controlling-cam 45 to cause the centering-tool 41 to engage the end of the blank or block 57. This movement of the spindle 38 takes place when the chucking-heads reach the top portion of the machine. (See particularly Figs. 1, 2, and 3.) The controlling-cam 45 is secured at its bottom portion to the brace $45^b$ and at its top portion to the hanger-brace $45^t$, both of which braces are securely bolted to the main frame of the machine.

The gage-toes 46 and 47 are formed integral on the inner ends of the gage-rods 48 and 49, and said rod 48 is adapted to slide longitudinally in its bearings 50 and 51, formed integral on the bearings 32 and 33, and the opposing gage-rod 49 is adapted to slide longitudinally in its bearings 52 and 53, formed integral on the bearings 39 and 40. Coil-springs 54 surround each of the rods 48 and 49 and are so situated on their respective gage-rods and secured thereon as to cause said rods to move in opposed directions—that is, one coil-spring 54 is arranged to surround the rod 48 between the bearing 50 and the cam-dog 55, secured on said rod 48, and the other coil-spring 54 is arranged to surround the rod 49 between the bearings 52 and the cam-dog 56, secured on said rod 49, and both of said springs are provided for the purpose of removing the gage-toes 46 and 47 of said gage-rods 48 and 49 by sliding said rods longitudinally out of engagement with the back or rear side of the block or blank 57 immediately the latter has been centered and chucked on and between the centering-tools 34 and 41, and at the time at which the blank has been engaged the cam-dogs 55 and 56 are simultaneously released from their cams 58 and 59, thereby permitting said coil-springs to operate said gage-rods 48 and 49 to move longitudinally.

The cams 58 and 59 are each secured at their lower ends to their supporting-braces 60 and 61, which latter extend from the top cross-rail 11, to which they are firmly secured, and the said cams extend inwardly and upwardly or approach each other toward their supporting-hangers 62 and 63, also secured to the top cross-rail 11. The cams 58 and 59 are each situated at equal radial distance from their common center—namely, the axis of the carrier-shaft 12—around which center the chucking-centers are revolved.

I will now proceed to describe the forming means, which mechanism is situated at the rear or back end of the machine. A rapidly-revolving knife-head $64^k$, carrying the knives 64 and 65, which are ground to a templet of the form required—as, for instance, to cut pins, such as the pin 37, as shown particularly in Figs. 1, 2, and 3—is keyed or otherwise secured on its shaft 67, which latter is provided with a suitable belt or drive pulley 66 and is mounted to turn in its bearings formed integral on each of the standards 68, secured on the traversing head 69. The traversing head 69 is supported by and rests on the table 5 and is adapted to be traversed or moved in and between its guideways 70, secured on said rear table 4, and a traversing screw 71 screws into the depending lug 72, formed integral on or secured to the bottom side of the carriage 69, and said screw has its neck-journal 73 journaled in the bearings 74, wherein it turns, and on the outer projecting end of said screw is secured the hand-wheel 75, whereby said traversing screw 71 is turned to traverse said carriage 69 to adjust the knife-head $64^k$ into position to dress the block or blank 57 to form an article therefrom, as the pin 37, which is reduced to the proper form and diameter. That of the chucking-heads that is situated at the top portion of the machine—i. e., the block or blank receiving portion—after having received the blank or block 57 is carried, by means hereinafter more fully set forth, round from this position by the revoluble carrier, composed of the spiders 13, 14, and 15, into position in front of the knife-head 64$^k$ to be dressed by the latter, and the said centers in thus moving cause the cam-roller 42 to contact with the chucking-cam 76, which latter is rigidly secured at its top end to the upright 9, and said cam has its cam-surface inclined gradually outwardly and toward its lower free end, so that when the cam-roller 42 contacts with said cam-surface it will be gradually pressed tighter to cause more force to be applied to the center 41 to force the latter firmly against and into the end of the wood block or blank 57 to securely hold the same on its centers while being operated upon by the knives 64 and 65 of the knife-head 64$^k$. To further add to the security and stability of the blank 57 on its centers 34 and 41, I provide an additional means for applying force to said centers and reinforcing them when presenting said block or blank 57 to the operation of the dressing-knife, and which consists of a weighted pressure-lever 77, provided with a suitable weight 78, pivotally supported by the fulcrum-pin fork 79, secured on the standard 80, which latter is secured on the pedestal or base 7, and said lever 77 has its shorter depending end or arm 81 bearing against the outer projecting end of the sliding pin 82, which latter is adapted to slide longitudinally in its bearings 83, formed integral on the standard 80, and the opposite inner end of said sliding pin 82 bears against the free rear portion of the chucking-cam 76 to cause the necessary yielding pressure to be applied to the center 41 to securely hold said blank or block 57 while being dressed. It is necessary when the blank 57 arrives in its position relatively in front of the knife-head 64$^k$ to be dressed that the said blank or block be rotated slowly round its own axis and in the same direction of rotation of the knife-head 64$^k$ for the purpose of presenting all sides of said blank to the action of the knives 64 and 65 of the cutter or knife head 64$^k$ to form a truly rounded and smooth peripheral surface on the pin or other article turned, and for this purpose I provide the friction-pulley 84, arranged to continuously rotate while the machine is in operation, which pulley contacts the pulleys 35 successively when they are moved into working position at this portion of the machine—that is, when the blank or block 57 is carried into position in contact with the knife-head 64$^k$ to be slowly rotated thereby in the direction indicated by the arrow. The pulley 84 is secured on the arbor 85, which is journaled in the journal-bearings 86, formed on the top ends of the rocker-arm 87, and said arbor 85 is extended outwardly to carry the drive-pulley 88, which latter is driven continuously by a belt extending from any suitable shaft conveniently situated. The rocker-arms 87 are keyed on or otherwise firmly secured to the arbor 89, which latter is pivotally mounted in its bearings 90, formed in the top ends of the standard 100, and the said arbor 89 has a weighted lever 101, provided with a weight 102, secured on its prolonged end, and said lever is arranged to swing or move said friction-pulley 84 inwardly to firmly contact and bear against the pulleys 35 alternately as they arrive in position to as nearly as possible impart positive rotation to them. This turning or dressing operation constitutes the first stage of the process of forming the pins 37, after the completion of which the latch 103 is automatically operated to disengage the catch 104, secured on the spider 13 of the carrier (see Figs. 1 and 5) by the mechanism hereinafter more fully set forth, and thus the carrier-shaft 12 and its spiders 13, 14, 15, and 16, constituting the carrier-frame, being released are free to turn in the direction indicated by the arrow to cause the next consecutive chucking-head to be moved into position in its order before the knife-head 64$^k$, at which time the latch 103 engages the next successive catch 104 to retain the carrier and the chucking-heads attached thereto at rest while the next blank in order is being operated upon by the knife-head 64$^k$ and to retain said chucking-head, carrying the turned pin 37, in its next position, which is the bottom position intermediate the turning position, and the final or screw-cutting position, which is the position in the machine at which the pin is finally operated upon. The period of rest of the carrier affords sufficient time for the operator to observe by ordinary inspection whether or not said pin is perfect or imperfect, and if it is found that the pin 37 is imperfect, either by reason of the quality of the work or the nature of the wood composing it, it is removed at this point or position.

The removal of the imperfect pin 37 is readily and quickly accomplished by the knock-out lever 105, (see Figs. 2 and 3,) which is pivotally connected to the lugs 106 and has its knock-out end 107 situated directly under the pin 37 when in the said lower position and swings in the same vertical plane in which said pin is situated. A rod 108 is pivotally connected to the lever 105 and projects upwardly through the floor of the operator's platform 109, and on the upper end of said rod 108 is either formed integral or secured the foot-stirrup 110, upon which the operator places his foot when using said knock-out lever 105.

I will now proceed to describe the means whereby the turned pin 37, that has been passed as entirely free from defects, is threaded, which is the final operation required to finish the pin before delivering it into the receptacle provided for them.

The turned pin 37 having been found by the operator to be free from defects and sound is permitted to remain in and between its centers and is carried beyond the knockout position to the next or finishing position, which is the final position, at which position the chucking-head and the pin 37, carried by it, are brought to rest temporarily simultaneous with the period of rest at which the blank 57 is being inserted into the chucking-head situated at the top portion of the machine, and a blank is being turned by the knife-head $64^k$ at the turning or dressing position, and which period of rest is entirely controlled by the mechanism which I will now proceed to describe.

A tool-carrying bar 112, preferably cylindrical in form, (see Figs. 1 and 2,) is mounted in the bearings 113, formed integral on the standards 114, and the said bar is adapted to be rotated a limited distance in said bearings and to be moved longitudinally therein. An arm 115 is secured on one end of said tool-carrying bar 112 by a set-screw 116 to be adjustable on said bar, and a chasing point or tool 117 is adapted to fit in between the threads of the master-screw 36, by means of which latter the bar 112 is moved longitudinally.

A thread-cutting tool 118 is secured on the free end 119 of the tool-carrying arm 120, and the said arm is adjustably secured to the said bar 112 by a set-screw 121. A coil-spring 122 surrounds said bar 112 intermediate the arm 120 and the top bearing 113 of the stand 114 at the left-hand side. (See Figs. 1 and 2.) The right-hand prolonged end of the bar 112 is provided with the stop-collars 123 and 124, each of which is adjustably secured to said bar, and between said stop-collars is situated the free longer end of the latch-lever 125. The latch-lever 125 is pivotally supported on its fulcrum-bracket 126, secured to and supported by the pedestal or base 7, and said lever has its shorter arm 127 pivotally connected to the outer end of the latch-bar 103, which latter bar is supported to slide longitudinally in its bearings 128, formed on the supporting-standard $128^a$, which latter is also securely bolted to the pedestal or base 7. It will be readily understood that when the chuck-heads carrying the finished pin 37 have reached the position at which said pin contacts with the thread-forming tool 118 the chasing-tool 117 engages the threads of the master-screw 36, and by this means the said arm 115, the carrying-bar 112, and all the pieces connected thereto are simultaneously traversed along with it, and when the chaser 117 has traversed along said master-screw 36 to cause the thread-cutting tool 118 to be traversed along the tapered end of said pin 37 to cut the required length of thread therein, which length of thread is first determined and then the stop 124 is adjusted accordingly, the stop 124 contacts with the lever 125 to withdraw the latch 103 out of engagement with the catch 104, and thereby permit the carrier, composed of the spiders 13, 14, 15, and 16, and said chucking-centers, to be rotated by the drive-pulley 21, the tension of the belt 22 of which is adjusted so that when the carrier is stopped and at rest said belt 22 will slip on the face of the drive-pulley 21 to the next adjacent position—that is, in the top position to receive another blank or block 57—and at this time or immediately the carrier moves to carry the master-screw 36, that one of which is in operative position, out of contact with the chasing-tool 117, said bar 112 is immediately carried back by its spring 122 into its starting position, (shown in Figs. 1 and 2,) which position corresponds with the lever 125 and the latch 103 when about to engage the catch 104, as shown in Fig. 1, in which position of the said bar 112 the threading-tool is about to commence to cut the thread in the next following pin 37. The finished pin 37 when it reaches this position is rotated by means similar to the friction-pulley means for rotating the said pin 37 when it reaches the position opposite the knife-head $64^k$ to be turned into form, and the said means consists of a friction-pulley 129, which is secured on the arbor 130 and is situated on said arbor between the bearings 131 of the rocker-arm 132, and said arbor 130 is rotated at the proper rate of speed by a pulley 133. The rocker-arms 132 are each secured on the arbor 134, which latter is pivotally supported in the bearings 135 of the standard 136, and on the outer prolonged end of said arbor 134 is secured the weighted lever 137, provided with the weight 138, which lever is adjusted and arranged to force the pulley 129 into contact with its drive-pulley 35 and thereby prevent any slipping between the contacting surfaces of the friction-pulleys.

The chasing-tool 117 is held in close contact with the master-screw 36 by a similarly-arranged weighted lever 139, secured on the tool-carrying bar 112 and having the weight 140 secured on the free end of said lever, and said lever 139 is arranged and adjusted to move the said chasing-tool into contact with said master-screw 36.

During the operation of turning the threads on the end of the pin 37 it is necessary that the dead center-tool or centering-tool 41 be pressed firmly against the end of the pin 37, and a greater force than that exerted by the closing coil-spring 122 is necessary to hold said pin firmly on its centers, and to accomplish this object I provide means similar to that employed in connection with this center-tool 41, when it is situated opposite the dressing-knife head $64^k$, where also additional force must be applied to said center-tool 41, and the said means consists in a weighted pressure-lever 141, having the weight 142 pivotally supported by the fulcrum-fork 143 on the standard 144, which latter is secured on the pedestal or base 7, and the said lever 141 has its shorter depending arm 145 bearing against the outer projecting end of the sliding pin 146, which latter is adapted to slide longitudinally in its bearings 147, formed integral on the top of its supporting-standard 144, and the opposite inner end of said sliding pin 146 is adapted to bear against the yielding front portion of the chucking-cam 148 to cause the necessary yielding force or pressure to be applied to the centering-pin 41 to securely hold said pin 37 on its centers while being threaded. Immediately after the completion of the operation of threading the pin 37 the tool-carrying bar 112, as previously described, releases the carrier, composed of the spiders 13, 14, 15, and 16, which carrier immediately rotates to carry the chucking-centers and the finished pin 37 upwardly, at which instant, or nearly so, the chucking centers or tools 31 and 41 automatically spread, or, which is the same thing, the centering-tool 41 is automatically operated to recede from the live center or chucking tool 34 to release the now-finished pin 37, immediately after which operation the said pin is discharged from the machine.

It is clear that owing to the great pressure applied to the chucking-center tools 34 and 41 to firmly hold the finished pin 37 between them that when said chucking-tools 34 and 41 are spread apart the chucking-tool 34 will be so deeply embedded in the end of the wood pin 37 that said pin will adhere to said center-tool 34, and in order to positively remove said pin and free it from said center I provide the stripping-hooks 149, formed on the standards 150, and the said hooks are so formed and situated relatively to said pin 37 when in the position to be threaded, as shown particularly in Figs. 1 and 2, to engage said pin in its upward course, remove it from the chucking-centers 34 and 41, to which it may have adhered to, and discharge it into the chute 151. The chute 151 is preferably hinged in any suitable manner to be swung back out of the way when such is necessary and may be hinged to the hinge-lugs 152, secured to or formed integral on the table 3 by a hinge-rod 153, which rod passes through said lugs 153 and the hinge-lugs 151$^a$ of the chute 151, and a support or rest 154 is secured on the bottom side of said chute for the purpose of supporting said chute 151 when swung into position to receive said pins as they are discharged from the machine at the proper angle relatively to the carrier. A series of flexible fingers 155 of a light resilient material or metal, as spring-steel, sufficiently strong to support the finished pins as they are discharged are secured on the free or receiving end of said chute and project slightly across the plane through which the pin 37 sweeps, so that said pin when passing upwardly will touch said fingers and raise them slightly, and said pin after having been raised slightly above said fingers or at a point near the stripping-hooks 149 said fingers are released and spring back into their normal position under the position of the rising pin 37 and under the stripping-hooks 149 to receive said pin as it is discharged from the latter.

Suitable supporting pins or stops 156 are situated under the levers 101, 137, and 139 and are provided for the purpose of supporting said levers when they reach their limit of swing and preventing them operating to swing the pieces to which they are connected out of operating position.

It will be noted that the spindles 31 and the centering-tools 34 must each in their turn be brought to a state of rest when the upper or top position or that position on the machine at which each of the chucking-centers receives its block or blank is reached. In order to accomplish this, I provide the break-block 161, which is secured to the cross-bar 11, and said block is situated so that its bearing or brake surface will contact with each of the pulleys 35 in turn as each approaches the blank or block receiving position to bring each of said pulleys to a state of rest.

The practice of my invention I will now proceed to describe. The wood from which the pins 37 are to be constructed is first sawed or otherwise dressed to size, preferably cut to blanks of uniform size, length, breadth, and thickness, and placed in a suitable receptacle conveniently situated near the operator. The operator stands on the platform 109, and when one of the pairs of chucking-centers is in the top position and at rest, in which position the centering-tools are spread apart their full extent, and the gaging-toes 46 and 47 have been automatically moved into their inner or gaging position—that is, into the position shown in Fig. 9—one of the blanks or blocks 57 is now placed on the supporting gage arms or fingers 160, with its side contacting with the gage-toes 46 and 47. Simultaneously with this period of rest and when one of the chucking-centers is in position to receive a blank the last of the series of the chucking-heads has its master-screw 36 in engagement with the chasing-tool 117 and by which means traverses the tool-carrying bar 112, and said chaser continues to remain in engagement with the master-screw 36 to traverse the tool-carrying bar 112 till it reaches that position at which the stop-collar 123 contacts the lever 125 to move the latch-bolt 103 out of engagement with the catch 104, at which time or instant the carrier, consisting of the spiders 13, 14, 15, and 16, moves in the direction indicated by the arrow—that is, to carry the block or blank 57 to the rotary dressing or turning knife-head 64$^k$; but before the said blank has been removed from the gage-toes 160 and after a very slight movement has been imparted to the carrier the dead or centering spindle 38 has its cam-roller 43 released from its controlling-cam 45, and immediately the centering-tool 41, by means of the actuating-spring 43, as previously described, is forced into the end of the blank 57, immediately after which movement the gage-toes 46 and 47 are operated to spread apart or recede from said blank. The carrier continues to revolve till it has moved the blank 57 into the position P. B., in which position the carrier is locked by the latch-bar 103, engaging the catch 104, and in this position of the pin the pulley 35 contacts with the friction drive-pulley 84 to rotate the said blank 57 in the same direction as the direction of rotation of the knife-head $64^k$, but at a much slower speed, and which speed need not be more than one or two revolutions during the period of rest of the carrier. Simultaneous with the operation of the carrier to stop and during the operation of dressing the blank 57 the chasing-tool 117 contacts with and engages the master-screw 36, and the tool-carrying bar 112 is traversed longitudinally in its bearings by said master-screw, and said bar 112 continues to move till a certain length of its path has been traversed, after which the latch-bolt 106 is released from its catch 107, at which instant the carrier again moves to disengage the master-screw 36 from the chasing-tool 117 and the now finished or turned pin 37 is transferred to the next position, which is the lower position P. C., in which position it remains at rest, as before, and if upon examination the material of the pin 37 is found to be unsound or the turning is imperfectly done the operator knocks said faulty pin out from between its centers 34 and 41 by means of the knock-out lever, as previously described. Simultaneous with this period of rest the chasing-tool 117 and the tool-carrying bar 112 operate to disengage the carrier as before, and the perfectly-turned pin 37 is transferred to the forward position F. D. to be threaded, in which position said carrier remains at rest till such times as the end of the pin 37 has been threaded the proper extent. When the pin 37 has reached this position, the pulley 35 contacts with the friction drive-pulley 129 to rotate the live-center or chucking tool 34 and the pin 37 engaged between said live-center and the dead-center 41, thereby chasing or cutting the screw-threads on said pin 37 by the thread-cutting tool in the manner as previously described. The threads having been cut to the proper length on the end of said pin 37, the carrier is again automatically disengaged and permitted to be moved to move the master-screw 36 out of contact with the chasing-tool 117 and to cause the cam-roller 42 to engage the fixed cam 45 to withdraw the center 41 out of contact with the end of the now-completed pin 37 and to release said pin from said chucking-head. The now-finished pin will fall by gravity into the chute 151, from which it is discharged into a suitable receptacle. If the pin should adhere to the live or chucking center 34, said pin will be carried upwardly with said chucking-centers till it contacts with the stripping-hooks 149 and be intercepted thereby and released from said centering chucks or tools 34 and 41 during the said upward movement of the carrier, which movement conveys this particular chucking-head into the position P. A., and immediately said now-completed pin 37 is stripped from its chucking-centers it will roll off said stripping-pins 149 into the chute 151 to be discharged into a suitable receptacle, as previously referred to. The completed and perfect pin 37 having now been removed from its chucking-centers, said centers 34 and 41 as they approach the primary or blank-receiving position P. A., the center 41 gradually recedes from its opposing or chucking center 34 till it has moved sufficiently far to permit a blank or block 57 to be easily inserted between said centers, and simultaneously with this movement of the center 41 the dogs 55 and 56 engage the cams 58 and 59 to cause the gage-bars 48 and 49 to slide toward or approach each other to bring the gage-toes 46 and 47 of said bars into position to the rear of the blank or block 57, which is placed on the supporting-fingers 160 to center said blank, and thus the machine continues to operate and while operating simultaneously receives the blank or block to be machined, turns a pin to the proper form of profile, threads the end of a pin, and delivers a finished and complete pin, as previously described.

Having thus fully described this my invention, what I claim as new and useful, and desire to cover by Letters Patent of the United States therefor, is—

1. In an automatic turning-machine, the combination with a revoluble carriage, of a head-stock and tail-stock carried thereby, gage-toes carried by said carriage arranged behind in the course of travel of said head and tail stocks and coöperating with said head and tail stocks, and means for coöperating said toes, and a cutting means coöperating with said stocks, sustantially as described.

2. In an automatic turning-machine, the combination with a carriage, of a head and tail stock, means for reciprocating said tail-stock, means for rotating said head-stock, reciprocating gage-toes on said carriage arranged behind and in the course of travel of the head-stock and coöperating with said stocks, and means for actuating said gage-toes, substantially as described.

3. In an automatic turning-machine, the combination with shaping means, of a carriage, chucking means and gage-rods carried thereby, said gage-rods arranged behind and in the course of travel of the head and tail stocks, and means for reciprocating said chucking means, and means for reciprocating said gage-rods, substantially as described.

4. In an automatic turning-machine, the combination with a frame and a shaping-head, of a carriage mounted in said frame, chucking means carried by said carriage, gage-rods carried by the carriage and arranged behind and in the course of travel of the head and tail stocks, overhanging cams for operating said gage-rods, and cams on said frame for reciprocating said chucking means and gage-rods, substantially as described.

5. In an automatic turning-machine, the combination with a revoluble carriage and its supporting-frame, a series of head and tail stocks, each of said tail-stocks comprising a revoluble center, a master-screw on said revoluble center, said stocks arranged at equal intervals apart round the periphery of said carriage equally distant from the axis thereof and parallel thereto, opposing gage-rods extending longitudinally and rearwardly of each of said stocks and each pair of said rods having their bends or gaging-toes directed toward and equally distant rearwardly of the common axis of said stocks, of a blank-receiving platform situated centrally on said frame and under the path of the upward-moving stocks, said platform coöperating with each pair of said gage-rods to center the blank to be turned, a tool traversing the carriage-bar, its returning-spring, a threading-tool carried by said bar, suitably-fixed bearings wherein said bar is adapted to be turned a limited amount and to be moved longitudinally, a revolving knife-head adjustably mounted on said frame, a latch, a latch-lever, stops on said tool-carrying bar arranged to operate said latch-lever, a master-screw chasing-tool, so situated on said traversing tool-bar, that, the master-screw of each of said chucking-centers engages said chaser alternately to traverse said tool-bar and to disengage said latch to release the latter whereby said carriage is permitted to rotate to interchange each of said stocks from one position to its next adjacent position, and disengaging said master-screw and said chaser to permit said tool-carrying bar to instantaneously return to its normal position, and suitable means and fixed cams situated to operate said stocks in their proper order and time during each movement of said carriage.

6. In an automatic turning-machine, the combination with a revoluble carriage, the cycle of which is divided into alternate periods of motion and rest, its supporting-frame, a series of head and tail stocks, each of said head-stocks comprising a revoluble chucking-center, a master-screw on said revoluble center, and a dead and traversing center, said chucking-centers arranged at equal intervals apart round the periphery of said carriage, equally distant from the axis thereof and parallel thereto, opposing gage-rods extending longitudinally and rearwardly of each of said centers and each pair of said gage-rods having their bends or gaging-toes directed toward and equally distant rearwardly of the common axis of said centers, of a blank-receiving platform, situated centrally under the path of the upwardly-moving head and tail stocks, a revolving knife-head, a knock-out lever pivotally mounted on said frame and under said carriage, a latch, a latch-lever, a traversing tool-carrying bar, a threading-tool carried by said bar, a chasing-tool so situated on said tool-carrying bar that the master-screw of each of said chucking-centers engages said chasing-tool alternately to traverse said bar and thereby operate said latch-lever to release said carriage whereby the latter is permitted to move to interchange each of said chucking-centers from one position to its next adjacent position, and releasing said master-screw from said chaser to permit said tool-carrying bar to return to its normal or starting position ready to thread the next consecutive piece, suitable springs on said gaging and said dead-centers, and suitable fixed cams arranged and situated to operate to control the operation of said gaging-rods and dead-centers at their proper times and simultaneously with the movements of said carriage, and cams for positively closing said dead-center to retain said blank when being worked, and for positively opening said dead-center to release the article when finished, and a suitable receiving and delivering chute situated in position on said frame to receive each of the articles when discharged therefrom.

7. In an automatic turning-machine, the combination with a shaping-head, of traveling chucking means, gage-toes arranged behind and in the course of travel of the chucking means, means for projecting said chucking means, and means for projecting said gage-toes prior to the projection of said chucking means, substantially as described.

8. In an automatic turning-machine, the combination with a shaping-head, of traveling chucking means, gage-toes arranged behind and in the course of travel of the chucking means, means for projecting said chucking means, means for projecting said gage-toes prior to the projection of said chucking means, and means for withdrawing said gage-toes subsequent to the projection of said chucking means, substantially as and for the purpose set forth.

9. In an automatic turning-machine, the combination with a carriage and feed means, of work-holding means on said carriage, spring-pressed reciprocating gage-rods arranged behind and in the course of travel of the work-holding means, adjustable cam-dogs secured thereon, and cams adapted to be engaged by said cam-dogs, substantially as and for the purpose set forth.

10. In an automatic turning-machine, the combination with a frame, of a revoluble carriage, a rotary head-stock and a reciprocating tail-stock on the carriage, cams on the frame for withdrawing and projecting said tail-stock, gage-rods mounted on said carriage arranged behind and in the course of travel of the head and tail stocks, cams on the frame for projecting said gage-rods, and springs on said gage-rods for withdrawing the same, substantially as described.

11. In an automatic turning-machine, the combination with a cutting means, of a revoluble carriage work-holding means thereon, a resilient cam having a fixed end and its free end adapted to engage with the work-holding means, the work-holding means first engaging the fixed end of the cam, and means for forcing said free end of the cam against the work-holding means, substantially as described.

12. In an automatic turning-machine, the combination with a revoluble carriage, each cycle of which is divided into alternate periods of motion and rest, its supporting-frame, a blank-receiving platform situated centrally over said carriage, a thread-cutting tool, and a forming cutter-head, of a series of revoluble head and reciprocating tail stocks all supported by said frame, said head and tail stocks supported on the periphery of said carriage at equal intervals apart equally distant from and in a parallel relation with the axis of said carriage, a master-screw on the spindle of each of said revoluble head-stocks so arranged on said carriage that, when the first head-stock is receiving its blank, the second head is operating to turn its blank, and the master-screw of the last or third operating head-stock is operating to traverse said threading-tool, and means connected to said threading-tool whereby the periods of motion and rest of said carriage are controlled.

13. In an automatic turning-machine, the combination with a revoluble carriage, each cycle of which is divided into alternate periods of motion and rest, its supporting-frame, a blank-receiving platform situated centrally over said carriage, a thread-cutting tool, a bar carrying said tool, and a forming cutter-head all supported by said frame, said head and tail stocks arranged around and secured on the periphery of said carriage, equally distant from and in parallel relation with the axis of the latter, a master-screw on each of the spindles of said revoluble head, and said head and tail stocks so situated and arranged on the periphery of said carriage that, when the first stock is receiving its blank, the second stock is operating to turn its blank, and the master-screw of the third operating-center is engaging said tool-carrying bar to traverse the same and its threading-tool longitudinally of the piece to be threaded, and means connected to said tool-carrying bar whereby the periods of motion and rest of the carriage are controlled.

14. In an automatic turning-machine, the combination with a revoluble carriage, each cycle of which is divided into alternate periods of motion and rest, its supporting-frame, a blank-receiving platform situated centrally over said carriage, a thread-cutting tool, a traversing-bar carrying said tool, bearings wherein said bar is supported to slide and be turned a limited amount therein, and whereby the said bar is maintained in parallel relation with the axis of said carriage, and a cutter-head all supported by said frame, of a series of revoluble head-stocks and reciprocating tail-stocks arranged at equal intervals apart round the periphery of said carriage equally distant from and in parallel relation to the axis thereof, a master-screw on each of the spindles of said revoluble head-stocks, said head and tail stocks so situated and arranged on the periphery of said carriage that, when one head-stock is receiving its blank, the head-stocks are operating to turn the piece, and the master-screw of the third operating head-stock is in engagement with said tool-carrying bar to traverse the same and to operate the threading-tool thereof, a latch-lever and a stop on said tool-carrying bar whereby said latch-lever is operated to release said carriage to permit the movement of the latter to interchange the said stocks.

15. In an automatic turning-machine, the combination with a revoluble carriage, each cycle of which is divided into alternate periods of motion and rest, its supporting-frame, a blank-receiving platform situated centrally over said carriage, a thread-cutting tool, and a tool-carrying bar, bearings whereby said bar is supported, and maintained in parallel relation with said carriage and wherein said bar is adapted to be turned a limited extent and to be traversed longitudinally, suitable means connected to said bar to move the threading-tool into normal and operative position, and a revoluble cutter-head, of a series of revoluble head-stocks and reciprocating tail-stocks arranged at equal intervals apart around the periphery of said carriage equally distant from and in parallel relation to the axis thereof, a master-screw on each of the spindles of said revoluble head-stocks, said stocks so situated and arranged on the periphery of said carriage that, when one stock is receiving its blank, the second stock is operating to turn its piece and the master-screw of the third operating-stock is in engagement with said tool-carrying bar to traverse the same and to operate the threading-tool thereof, a latch-lever and a stop on said tool-carrying bar whereby said latch-lever is operated to release said carriage to permit the movement of the latter to interchange the said stocks.

16. In an automatic turning-machine, the combination with a revoluble carriage, each cycle of which is divided into alternate periods of motion and rest, its supporting-frame, a blank-receiving platform situated centrally over said carriage, a thread-cutting tool, a tool-carrying bar, bearings whereby said bar is supported and maintained in parallel relation with the axis of said carriage and wherein said bar is adapted to be turned a limited extent and to be traversed longitudinally, a revolving knife-head, a spring operatively connected to said bar to return the tool thereof into operative normal position, of a series of revoluble head-stocks and reciprocating tail-stocks arranged at equal intervals apart around the periphery of said carriage, equally distant from the axis thereof, and in parallel relation thereto, a suitable spring operatively connected to said tail-stock to move the same to engage the blank to be carried by said stocks, a master-screw on each of the spindles of said revoluble head-stock and having its profile conforming with the profile of the article to be threaded, said head and tail stocks so situated and arranged on the periphery of said carriage that, when one stock is receiving its blank, a second stock is operating to turn its piece and the master-screw of the third operating-stock is in engagement with said tool-carrying bar to traverse the same and to operate the threading-tool thereof, means for maintaining said tool-carrying bar in engagement with said master-screw while the carriage is at rest, a latch-lever operatively connected to said tool-carrying bar whereby, when said thread-cutting tool has traversed the full extent of its path, said latch-lever will operate to release said carriage and to permit the same to move to interchange the stocks and suitable fixed cams arranged and situated so that, when said carriage is moved the reciprocating tail-stock will be maintained open to receive the blank, then released to engage the latter and finally to firmly hold said stock in engagement with said blank while the latter is being turned and threaded.

17. In an automatic turning-machine, the combination with a revoluble carriage, of feeding means, a shaping-cutter, knock-out means and a further tool, means for traversing said tool to cut a thread and a stripping means all arranged in the path of travel of said carriage, head and tail stocks on said carriage, depressing-cams engaging with said head and tail stocks, a withdrawing-cam engaging with said head and tail stocks, a discharge-hopper relative to said stripping means, automatic means for rotating said head and tail stocks relative to said shaping-cutter and threading-tool, centering means adapted to act in conjunction with said feeding means, and a brake for stopping said head and tail stocks relative to said feeding and centering means, substantially as described.

18. In an automatic turning-machine, the combination with a frame, of a revoluble carriage, chucking means carried by said carriage, centering means carried by said carriage, feeding means, a shaping-cutter, and a further tool arranged on the frame in the path of travel of said chucking means, and means on the frame for braking said chucking means relative to the said feeding and centering means, substantially as described.

In testimony whereof I have hereunto set my hand in the presence of two subscribing witnesses.

BONNEVENTURE T. MAGERS.

Witnesses:
HARRY OREM,
LINCOLN V. CRAVENS.